Oct. 9, 1934.    L. F. NENNINGER ET AL    1,976,137
HYDRAULICALLY ACTUATED SLIDE FOR MACHINE TOOLS
Filed Nov. 13, 1931    2 Sheets-Sheet 1

Inventor
LESTER F. NENNINGER
BERNARD SASSEN

By A. H. Parsons
Attorney

Oct. 9, 1934.　　L. F. NENNINGER ET AL　　1,976,137
HYDRAULICALLY ACTUATED SLIDE FOR MACHINE TOOLS
Filed Nov. 13, 1931　　2 Sheets-Sheet 2

LESTER F. NENNINGER
BERNARD SASSEN
A. H. Parsons, Attorney

Patented Oct. 9, 1934

1,976,137

UNITED STATES PATENT OFFICE 1,976,137

HYDRAULICALLY ACTUATED SLIDE FOR MACHINE TOOLS

Lester F. Nenninger and Bernard Sassen, Cincinnati, Ohio, assignors to The Cincinnati Milling Machine Company, Cincinnati, Ohio, a corporation of Ohio Application November 13, 1931, Serial No. 574,801

15 Claims. (Cl. 90—21.5)

This invention relates to machine tools having power and manually operated slides and more particularly to improvements in the control mechanism for such slides.

The mechanism for effecting translation of a movable slide on present machine tools is usually provided with a hand wheel or lever for effecting manual translation of the slide. In instances where the slides are heavy, these levers are lengthy in order to provide sufficient leverage or mechanical advantage that the operator may conveniently actuate them. Such long levers are however, objectionable as they create dangerous conditions, increase the cubical size of the machine, reduce the working space around the machine and are tiresome to operate for any length of time.

It is therefore one of the principal objects of this invention to provide a new and improved means for effecting manual adjustment of a machine tool slide which is so contrived that a small control knob which may be operated by a twist of the hand is substituted for the hitherto long control lever requiring much effort to operate.

In effecting manual translation of a milling machine slide such as the knee, the operator must of necessity bend over in rotating the manual control lever with the result that the upper parts of the body come close to the rotating cutter or other moving slides with great possibility of physical injury to himself. It is, therefore, another object of this invention to improve the manual actuating means for the knee of a milling machine that such dangerous methods of operation are eliminated by providing a manual control that is so mounted and easy to operate that it may be actuated by the operator while in an upright and safe position.

In prior machines having a plurality of slides it was necessary to have the control shafts diverge so that the levers on the operating ends had sufficient swing to prevent interference. This spread the control station as well as adding to the cubical size of the machine which thereby infringed on the working spaces about the machine. A further object of this invention therefore, is to provide a manual control mechanism for a movable slide which is so constructed that it may be operated by control members which require little or no operating space and are of such size that they may be conveniently nested in a narrow control space thereby reducing the spread of the machine which in turn reduces the operating space necessary to have about the machine.

A still further object of this invention is to provide in a machine tool member having power operated translating means, a self-contained unit under manual control for effecting small, accurate, predetermined amounts of adjustment thereof.

An additional object of this invention is to provide a new and improved mechanism in combination with manual and power operating mechanisms for a machine tool slide for positively disconnecting the manual control means upon engagement of the power actuating mechanism.

Other objects and advantages of the present invention should be readily apparent by reference to the following specifications considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts:

The principles of this invention are susceptible of general application, but for the purposes of explanation the invention is illustrated as applied to a movable member of a knee and column type milling machine.

Figure 1:
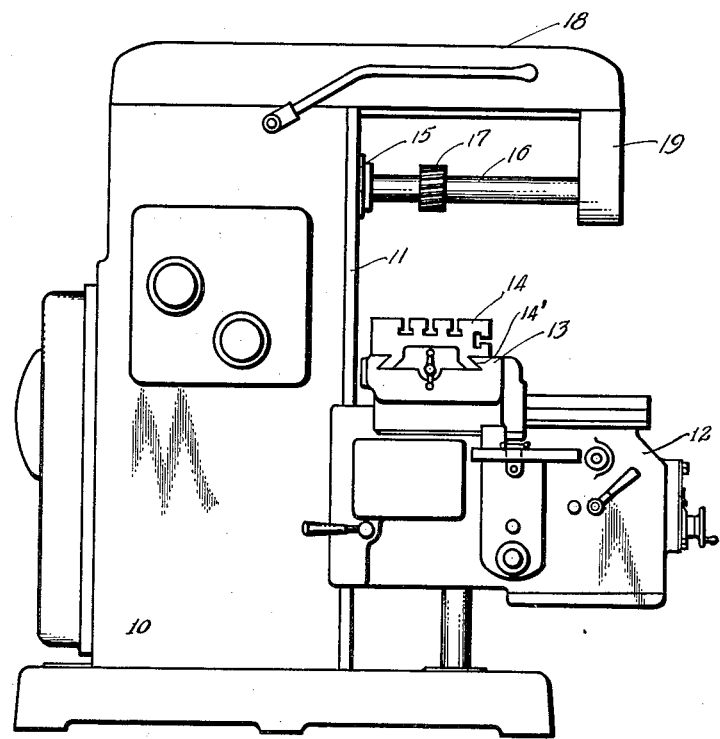
Figure 1 is an elevation of a machine tool embodying the principles of this invention.

In Figure 1 the reference numeral 10 indicates the column of a milling machine having guide ways 11 formed upon one face thereof for slidably receiving a knee 12 which in turn supports a saddle 13 for movement toward and from the column, the saddle also having guideways 14' thereon for receiving the table 14.

A cutter spindle 15 is journaled in the upper part of the column having secured in the end thereof a cutter arbor 16 upon which is mounted a cutter 17 for rotation therewith by the spindle. The outboard end of the arbor is journaled and supported in a pendant 19 depending from an over-arm 18 slidably mounted in guideways formed in the top of the column.

Figure 3:
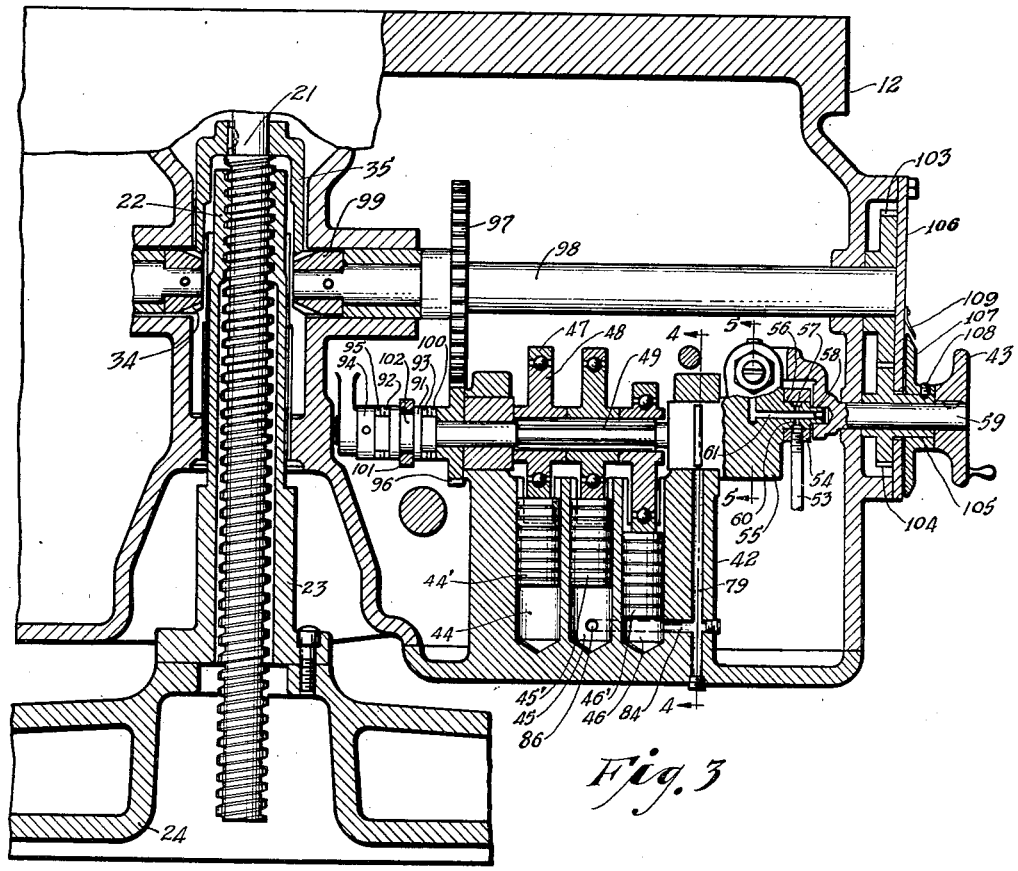
Figure 3 is an enlarged longitudinal section through the knee as shown in Figure 2.

As shown in Figure 3, the knee 12 is provided with a depending elevating screw 21 which is threaded in a nut 22, the nut being formed in the end of a tubular member 23 projecting upward from the base portion 24 of the column. To effect translation of the knee or, in other words, vertical movement thereof for adjustment toward and from the cutter spindle to vary the relationship between work and cutter, the screw 21 must be rotated relative to the nut 22 and to this end power and manual operable means have been provided.

Figure 2:
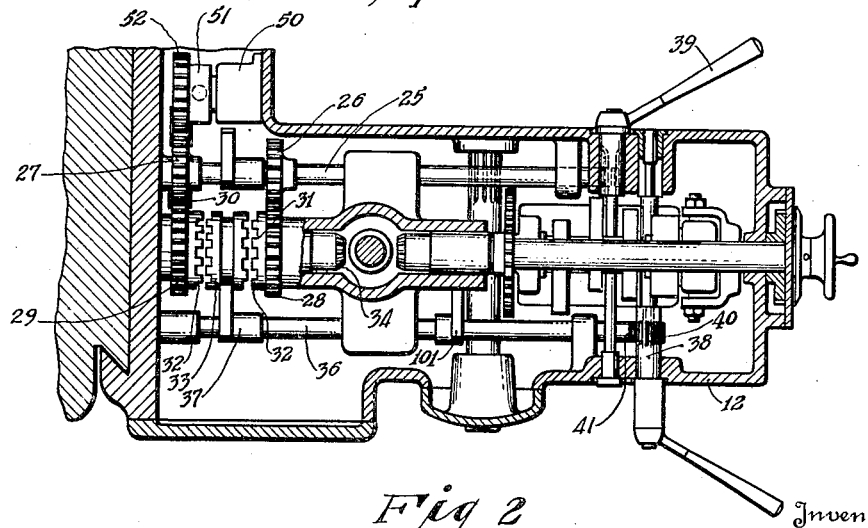
Figure 2 is a horizontal section through the knee showing the transmission and control mechanism therefor.

As more particularly shown in Figure 2, a power shaft 25 is journaled in the knee and adapted to be driven through suitable transmission from a prime mover, such as an electric motor not shown, mounted in the column of the machine. This transmission may be the same as that shown in co-pending application of Nenninger and Einstein, Serial Number 395,928, filed September 28, 1929 and therefore further description is not believed to be necessary herein. This shaft has keyed thereto spur gears 26 and 27, the gear 26 meshing directly with the gear 28 and the gear 27 actuating a gear 29 through an idler 30. The gears 28 and 29 are mounted for free rotation on a shaft 31 and are provided with clutch teeth such as 32, upon the opposing faces thereof. A clutch member 33 splined on the shaft 31 is interposed between the clutch faces of the gears 28 and 29 and shiftable into engagement with one or the other to effect rotation in opposite directions of the bevel gear 34 keyed to the end of the shaft 31. The gear 34 as shown in Figure 3 meshes with bevelled gear 35 which is keyed to the upper end of the screw 21. To determine the direction of movement of the elevating screw and thereby of the knee, a shifter rod 36 is provided having a shifter fork 37 integral therewith and embracing the clutch 33. The shifter rod is reciprocable by manual control means comprising a shaft 38 which extends crosswise of the knee and provided on the external end thereof with an operating handle 39. Pinion teeth 40 formed on the shaft engage with rack teeth 41 formed on the shifter rod 36 whereby rotation of the handle in opposite directions will determine the direction of power rotation of the elevating screw.

It is general practice to provide manual means for actuating a translatable slide of a machine tool in addition to power means because finer and more accurate adjustments can be obtained in this manner. However, it is generally necessary to provide long operating levers for the manual adjusting means in order to provide sufficient mechanical advantage or leverage so that the operator may be able to actuate the same with some degree of facility and convenience. Long operating levers increase the working space necessary to have about the machine requiring greater spacing between machines for instance and furthermore necessitating that the various operating shafts be mounted at an angle to one another in the machine in order that their operating levers will not interfere. Since these translating mechanisms heretofore mentioned are power operated as well as manually operated, it is necessary to detach or declutch the manual operating lever from the mechanism when the power means is being utilized. Although automatic means have been utilized for this purpose, they are not absolutely positive in operation and it too often happens that when the power feed is engaged the operating handle suddenly whirls around because not entirely disconnected with a possibility of serious injury to the operator. It is therefore desirable that means be provided for effecting manual adjustment of a translatable support which will eliminate the use of long operating levers as well as overcoming other objections thereto.

The invention comprises in general an auxiliary power means such as a servomotor 42, under the control of a small knob 43, for rotating the bevel gear 35 and thereby the feed screw 21. The motor, as shown in Figure 3, comprises three cylinders 44, 45 and 46 in which are mounted pistons 44', 45' and 46', each piston bearing against a ring 47 which is anti-frictionally mounted on an eccentric portion 48 splined on a drive shaft 49. Each eccentric is angularly displaced 120° relative to the others. Although three cylinders are shown, it will of course be apparent that this number may be varied without departing from the invention.

Fluid pressure is supplied to the motor from a pump 50 located in the knee and actuated by an eccentric 51 integral with a common drive gear 52 which actuates the gears 26 and 27. The pressure is conducted from the pump to the inlet pipe 53 of the motor which is threaded in a collar 54, and holds the collar against movement relative to the valve casing 55. The pilot valve casing 55 has a reduced portion 56 on which the collar 54 is journaled and it has an annular groove 57 formed in its periphery for maintaining constant communication with the inlet pipe 53. The end of the valve casing is further reduced at 58 to form a pilot bearing in the end of the manual control shaft 59. Radial ports 60 establish communication between the annular groove 57 and an axial port 61 formed in the valve casing which terminates as shown in Figure 5 in a radial channel 62.

A bore is formed in the valve body at right angles to the bore 62 and has reciprocably mounted therein a shuttle valve 64 which has spools 65 and 66 formed on opposite ends thereof. These spools close a pair of annular grooves 67 and 68 when the valve is in a central position. The portions of the shuttle valve extending beyond the ends of the spools are each formed with three flats, such as 69, and spaced 120° apart but these flats do not intersect with one another, thereby providing bearing surfaces 70 forming a three point bearing at opposite ends of the valve. This prevents the edges of the spools from interfering with the edges of the annular grooves upon shifting of the valve. The flat surfaces serve as openings when the valve is moved in either direction from its central position to allow leakage from the respective annular grooves.

A pair of channels 71 and 72 are also formed in the valve body upon opposite sides of the pressure channel 62. The lower end of these channels intersect with longitudinal bores 73 and 74 which extend to segmental slots 75 and 76 formed in the periphery of the valve casing as more particularly shown in Figure 4. It will be noted in that figure that there is a diametrical portion 77 dividing the two grooves which has sufficient curvature at the periphery to close a port 78 in a channel 79 formed in the pump casting. The grooves 75 and 76 communicate with ports 80 and 81 respectively, these ports being the terminus of additional bores 82 and 83 also formed in the pump casting. A longitudinal channel 84 connects the channel 79 with the bottom of cylinder 46. Additional longitudinal channels 85 and 86 connect the vertical channels 82 and 83 with cylinders 44 and 45 respectively. It should now be apparent that the channel 62 and the valve casing are under pressure at all times by virtue of its connection with pipe 53 extending from the pump.

Figures 4, 5, 6:
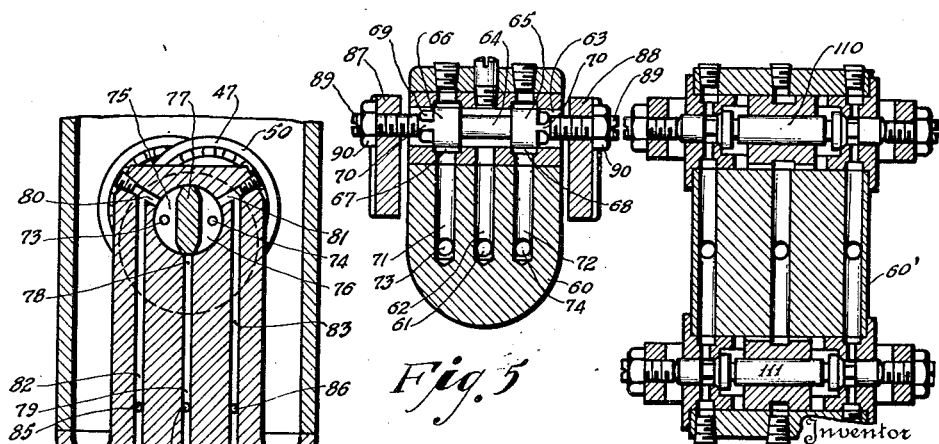
Figure 4 is a section on the line 4—4 of Figure 3.
Figure 5 is a section on the line 5—5 of Figure 3.
Figure 6 is a modified form of the control member shown in Figure 5.

If the shuttle valve is now moved from its central position as for instance to the right of its position shown in Figure 5, the pressure channel 62 will be coupled with the port 68, pressure then flowing through channels 72 and 74, grooves 76, port 81, channels 83 and 86 to the lower end of the cylinder 45. At the same time the channel 85 communicating with the lower end of cylinder 44 will be connected through port 80, groove 75, channels 73 and 71 to port 67 and thereby to exhaust. Movement of the shuttle valve to the left of its central position will produce the reverse result, the port 68 then being connected to exhaust and the port 67 being coupled with pressure.

To obtain progressive controlled movement of the servomotor, the shaft 59 is provided with an enlarged end which is bifurcated to form a pair of arms 87 and 88 which embrace the opposite ends of the shuttle valve 64. To provide for adjustment, set screws 89 are threaded in the ends of the arm for engagement with the ends of the valve. Lock nuts 90 are provided to maintain the said screws in adjusted position. This makes it possible to insure against lost motion between the operating shaft and the valve.

In operation the control knob 43 is rotated a predetermined amount which will cause movement of the shuttle valve to the right or left relative to the valve casing, as previously explained, thus permitting the pressure to flow to the pump, which in turn will cause rotation of the drive shaft 49. Since the valve casing 55 is integral with the shaft 49 it is apparent that upon rotation of the shaft 49 that the valve casing will move relative to the shuttle valve 64 thereby moving the parts again to the relative position shown in Figure 5. When the valve assumes this position the motor will stop. Further movement of the knob 43 will cause further rotation of the shaft 49 until the valve casing and the shuttle valve are again in neutral position. In other words, as the shuttle valve is shifted, the valve casing is moved to follow up the shifting movement of the valve and constantly tends to attain a neutral position relative to the shuttle valve. Attention is invited to the fact that the width of the spools 65 and 66 may be made exactly the same width as the ports 67 and 68 whereby the slightest movement of the valve in one direction or the other will produce movement in the pump thereby making it possible for very fine adjustments of the elevating screw and thereby the knee to be made.

The shaft 49 may be rotated as many revolutions by the pump as the control knob is turned, the portion 77 acting as a valve for the pump to prevent dead centering thereof.

The shaft 49 is connected to the lead screw 21 through the following mechanism. A clutch spool 91 is mounted for free rotation on the end of the shaft 49 and provided with clutch teeth 92 and 93 on opposite ends thereof. A collar 94 is pinned to the end of the shaft 49 and provided with clutch teeth 95. On the opposite side of the clutch member 91 is a gear 96 which is mounted for free rotation on the shaft 49 and engaging a gear 97 keyed to a horizontal shaft 98 which is journaled in the knee parallel to the shaft 49. A bevel gear 99 is secured to the end of the shaft 98 in mesh with the bevel gear 35 on the lead screw 21. The gear 96 is provided with clutch teeth 100 which are engageable with the teeth 93, of the clutch member 91.

Attention is invited to the fact that the clutch teeth on the opposite sides of the member 91 are of sufficient length that when the member 91 is in a central position relative to the collar 94 and the gear 96 that they will engage the clutch teeth on both of these members simultaneously. In other words, when the member 91 is in a central position the shaft 49 and collar 94 are coupled in driving relationship with the gear 96 and thereby with the lead screw 21. If the clutch member 91 is now moved to the left or to the right this relationship will be broken. It will thus be seen that when the member 91 is moved either to the right or to the left from a central position that the driving connection is broken.

This is for the purpose of forming a positive interlock between the control lever 39 which determines power actuation of the feed screw, and the manual control lever 43. To this end the shifter rod 36 is provided with a shifter fork 101 which engages an annular groove 102 in the clutch spool 91 and from Figure 2 it will be seen that when the clutch 33 is shifted to the right or to the left to effect power rotation of the lead screw in either direction that the servomotor will be disconnected from the bevel gear 35. Thus lever 39 has three positions, that is, a central position in which the servomotor is coupled to the lead screw and clutch 33 is in a neutral position; and extreme positions on opposite sides of the central position in which the servomotor is disconnected from the lead screw and the clutch 33 is in one or the other of its operative positions.

In order to indicate the amount of movement that the knee has made either manually or by power, the shaft 98, which is permanently coupled with the lead screw 21 through the bevel gears 35 and 99, is provided on one end with a gear 103 meshing with a gear 104 mounted for free rotation on the shaft 59. The gear 104 is provided with a hub 105 which projects through the cover plate 106 for receiving an indicator dial 107 fastened thereto by a set screw 108. A pointer 109 is secured to the cover 106 in cooperative relation to the dial to indicate the amount of movement made. By loosening the set screw it is possible to set the dial at zero relative to the pointer 109 at any time thereby making it easier for the operator to read the amount of a subsequent movement. It will also be noted that since the dial 107 is actuated from the shaft 98 that irrespective of whether the knee is elevated by power means or by the servomotor that the amount of movement will be recorded.

A modified form of the invention is shown in Figure 6 which may be utilized if greater accuracy is desired and comprises the use of two shuttle valves 110 and 111 which are mounted upon opposite sides of the axis of the valve casing 60'. The shaft 59 would be provided in this case with two bifurcated arms extending above and below its axis for engaging the opposite ends of the two valves. The advantage of this is that with the same movement used in the form shown in Figure 5 that the amount of valve opening will be double insuring quicker follow-up of the motor with the shuttle valves.

From the foregoing it should now be apparent that improved means have been provided for effecting manual operation of a machine tool slide which is simple and easy to operate and overcomes all the objections to prior device.

What is claimed is:

1. A machine tool having a support, a slide movable on said support, means to actuate the slide relative to said support including a rotatable translating member, hydraulic means for effecting rotation of said member including a progressively movable control valve, and a progressively movable control knob mounted on the slide and connected to the valve for determining the operation of said hydraulic means and thereby progressive movement of the slide.

2. A machine tool having a support, a slide movable on said support, means to actuate the slide relative to the support including a screw and nut, a rotary hydraulic motor coupled to one of the actuating members for effecting movement thereof relative to the other to effect translation of the slide, a source of hydraulic pressure, a manual control knob mounted on the slide and valve means actuable by intermittent unidirectional rotation of said knob to effect intermittent coupling of pressure to said motor and thereby intermittent progressive movement of said slide.

3. A machine tool having a support, a translatable slide mounted on said support, means to effect translation thereof including a screw and nut, one of which is attached to the slide, a rotary hydraulic motor coupled to one of the actuating members, a source of hydraulic pressure, a manual control knob mounted on the slide, valve means actuable by intermittent unidirectional rotation of said knob to effect intermittent coupling of pressure to said motor and a micrometer dial associated with the knob for indicating the amount of movement effected in the slide for each predetermined amount of unidirectional rotation of the control knob.

4. A machine tool having a support, a slide movable on said support, means to actuate the slide relative to the support including a screw and nut one of which is journaled in the slide, and the other fixed to the support, a power operable member for effecting rotation of the screw and thereby translation of the slide, a rotary hydraulic motor also coupled to the screw for effecting translation of the slide, a source of hydraulic pressure, a manual control knob mounted on the slide, means actuable by said knob to determine the coupling of pressure to said motor to effect translation of the slide when said member is disconnected, a micrometer dial associated with the knob and means coupling the screw with said dial to indicate the amount of slide movement effected by either of said translating means.

5. A machine tool having a support, a slide reciprocably mounted upon said support, means to effect said reciprocation including a screw journaled in the slide and a nut fixed in the support, a power operable means couplable with the screw to effect rotation thereof, a rotary hydraulic motor couplable with the screw to effect rotation thereof, an individual control lever for determining the coupling of said power means, and a manual control knob to determine actuation of said hydraulic motor, whereby the slide may be selectively actuated by said power means or by said hydraulic motor.

6. A machine tool having a support, a slide movable on said support, a power operable shaft for effecting movement of the slide relative to said support, a rotary hydraulic motor for effecting movement of the slide, a control member to determine actuation of the slide by said power shaft, an additional control member to determine actuation of the slide by said hydraulic motor, and interlocking means between the two control members whereby the hydraulic motor will be disconnected from the slide during actuation thereof by said power shaft.

7. A machine tool having a support, a slide movable on said support, a power actuable shaft, a reverser for coupling the shaft to the slide for actuation thereby, a control lever shiftable in opposite directions to determine the direction of power movement of the slide, an hydraulic motor, clutch means for connecting said hydraulic motor with the slide for actuation thereof, control means for determining the actuation of said motor and means actuable upon movement of said control lever to a power transmitting position to disconnect said clutch means and render the hydraulic motor ineffective.

8. A milling machine having a column, a knee slidably mounted upon the column, a power operable shaft journaled in the knee, translating means for the knee including a screw and nut, a power transmission extending from the shaft to said screw, a reversing clutch for coupling the transmission to the screw for selective actuation thereof in opposite directions, an hydraulic motor mounted in the knee, means to couple the hydraulic motor to said screw for actuation thereby, a pump mounted in the knee for actuation by said power shaft for supplying pressure to said motor, a control mechanism for actuating said reverser clutch and means automatically actuable by said control mechanism to disconnect the hydraulic motor during power actuation of the knee by said transmission.

9. A milling machine having a column, a knee mounted on the column, a power operable shaft journaled in the knee, a mechanical transmission for effecting actuation of the knee, a self-contained hydraulic unit mounted in the knee for effecting a step by step controlled movement of the knee, said unit having a pressure creator actuated by said power shaft, and control means operable to connect alternately the mechanical transmission or the hydraulic unit to said support for actuation thereby.

10. A milling machine having a column, a knee slidably mounted on the column, a screw rotatably journaled in the knee, a nut fixed on the column for receiving said screw, a multiple cylinder rotary servomotor coupled with the screw for effecting rotation thereof and thereby translation of the knee, a source of pressure, a shuttle valve interposed between the pressure and said motor, and a control knob mounted on the knee for determining the operation of the valve and thereby the amount of movement of the knee.

11. In a machine tool the combination with a movable slide and an actuating screw therefor of a servomotor, a power operable shaft, a selector clutch for operatively coupling the servomotor to said screw, a reverser mechanism operatively coupling the shaft to said screw, a manually operable control lever, motion transmitting means extending from the lever for moving the selector clutch to a motor coupling position, additional motion transmitting means extending from the lever to said reverser mechanism for determining the direction of power operation of the screw by said shaft, and means simultaneously operable by the lever upon actuation of the reverser mechanism to effect disconnection of the selector clutch.

12. In a machine tool having a movable slide and an actuating screw depending therefrom, the combination of separate power operable means for actuating said screw including a first clutch having a central position for operatively coupling one of said means to the screw and inoperative positions on either side of said central position, a second clutch having a neutral position and power transmitting positions upon either side thereof for coupling the other of said means to said screw, a single manually operable control lever for said clutches and connections between said lever and clutches whereby only one of said means can be connected to the screw at one time.

13. In a machine tool having a movable slide and an actuating screw connected therewith, the combination of a continuously power rotatable shaft, a servomotor normally at rest, a first clutch having a neutral position and operative positions upon either side thereof, said operative positions determining the direction of movement of said screw, a second clutch for operatively coupling the servomotor to said screw, means operable by the control lever for simultaneously moving the second clutch to an operative position upon movement of the first clutch to a neutral position, and additional means progressively movable for effecting progressive movement of said motor.

14. The combination with a movable slide of a milling machine for effecting relative movement between cutter and work, an operating screw connected with the slide, a screw actuating servomotor mounted on the slide, clutch mechanism for connecting and disconnecting the motor into and out of operative relation to the screw, said motor being normally at rest when connection is made to the screw, and additional manually operable means progressively actuable for effecting progressive actuation of said motor after connection to the screw.

15. The combination with a milling machine work table provided with means for effecting vertical movement thereof including an elevating screw, a manually controlled means for determining actuation of the screw, and a servomotor mounted on said means intermediate the screw and its controlling means for multiplying the mechanical advantage of said manual means whereby a small manual force may be converted into a large actuating force on the screw.

LESTER F. NENNINGER.
BERNARD SASSEN.